(12) United States Patent
Haritzer

(10) Patent No.: US 12,110,795 B2
(45) Date of Patent: Oct. 8, 2024

(54) DEVICE FOR LAYING PIPES IN THE GROUND

(71) Applicant: Spiderplow Rohr- & Kabelpflug GmbH, Mühldorf am Inn (DE)

(72) Inventor: Dominik Haritzer, Heiligenblut (AT)

(73) Assignee: SPIDERPLOW ROHR—& KABELPFLUG GMBH, Mühldorf am Inn (DE)

( * ) Notice: Subject to any disclaimer, the term of this patent is extended or adjusted under 35 U.S.C. 154(b) by 0 days.

(21) Appl. No.: 18/557,164

(22) PCT Filed: Apr. 28, 2021

(86) PCT No.: PCT/EP2021/061201
§ 371 (c)(1),
(2) Date: Oct. 25, 2023

(87) PCT Pub. No.: WO2022/228670
PCT Pub. Date: Nov. 3, 2022

(65) Prior Publication Data
US 2024/0263524 A1    Aug. 8, 2024

(51) Int. Cl.
*E02F 3/06*    (2006.01)
*E21B 7/04*    (2006.01)
(Continued)

(52) U.S. Cl.
CPC ............ *E21B 7/20* (2013.01); *E21B 7/04* (2013.01); *E21B 7/265* (2013.01); *F16L 1/028* (2013.01)

(58) Field of Classification Search
CPC . E02F 5/101; E02F 5/102; E02F 5/103; E02F 5/14; E02F 5/145; E02F 3/06; E02F 5/18; F16L 1/032; E21B 7/046
(Continued)

(56) References Cited

U.S. PATENT DOCUMENTS

| 544,850 | A | * | 8/1895 | Hoefs | ............... | E02F 5/102 |
| | | | | | | 171/57 |
| 2,118,553 | A | * | 5/1938 | Thom | ............... | E02F 5/102 |
| | | | | | | 172/170 |

(Continued)

FOREIGN PATENT DOCUMENTS

| DE | 19928682 A1 | 1/2001 |
| DE | 202016106630 U1 | 12/2016 |

(Continued)

OTHER PUBLICATIONS

WIPO/ISA/EPO, International Search Report and Written Opinion issued on Dec. 9, 2021 in PCT/EP2021/061201, 6 pages.
(Continued)

*Primary Examiner* — Kipp C Wallace
(74) *Attorney, Agent, or Firm* — J. Peter Paredes; Amin Wasserman Gurnani LLP

(57) ABSTRACT

The present invention relates to a device for laying pipes (1) in the ground, the device including
 a ploughshare (2) with a ploughshare shoe (3), wherein the ploughshare shoe (3) has at least one displacement element (5) protruding in a laying direction (4),
 a drill (6), which drill (6) is connected to the ploughshare (2) and comprises at least one drill head (7) arranged in a drill head housing section (7a) of a drill housing and a conveyor device (8) arranged in a conveyor housing section (8a) of the drill housing for removing drilled material in the form of soil grasped by the drill head (7) to the earth surface, and (Continued)

a connection device (9) for connecting a pipe (1) to be laid to the drill (6), wherein
the ploughshare (2) is arranged behind the drill (6) when viewed in the laying direction (4).

15 Claims, 2 Drawing Sheets

(51) Int. Cl.
 *E21B 7/20* (2006.01)
 *E21B 7/26* (2006.01)
 *F16L 1/028* (2006.01)
(58) Field of Classification Search
 USPC .................................................. 405/180, 174
 See application file for complete search history.

(56) References Cited

U.S. PATENT DOCUMENTS

| | | | | |
|---|---|---|---|---|
| 2,631,389 | A * | 3/1953 | Stovall | E02F 5/102 405/36 |
| 3,563,045 | A * | 2/1971 | Hansen | E02F 5/103 405/184 |
| 4,844,658 | A * | 7/1989 | Kohn | E02F 5/106 405/184 |
| 8,568,059 | B2 * | 10/2013 | Koegler | F16L 1/032 405/184 |
| 10,100,476 | B2 * | 10/2018 | Hughes, III | E02F 5/14 |
| 2016/0108606 | A1 * | 4/2016 | Strutynsky | E02F 5/103 37/351 |

FOREIGN PATENT DOCUMENTS

| | | |
|---|---|---|
| EP | 1063458 A1 | 12/2000 |
| EP | 1167681 A1 | 1/2002 |

OTHER PUBLICATIONS

European Patent Office, Decision to grant a European patent issued in priority application 21726561.0, Aug. 31, 2023, 2 pages.
European Patent Office, Intention to grant issued in priority application 21726561.0, May 3, 2023, 5 pages.
European Patent Office, First Office Communication of the Examining Division issued in priority application 21726561.0, Jul. 20, 2022, 3 pages.
European Patent Office, Reply to First Office Communication of the Examining Division issued in priority application 21726561.0, Nov. 14, 2022, 24 pages.

* cited by examiner

DEVICE FOR LAYING PIPES IN THE GROUND

CROSS-REFERENCE TO RELATED APPLICATIONS

The present application claims priority to PCT application serial no. PCT/EP2021/06120, filed Apr. 28, 2021, herein incorporated by reference in its entirety.

FIELD OF THE INVENTION

The present invention relates to a device for laying pipes in the ground, wherein the device comprises a ploughshare with a ploughshare shoe, a drill as well a connection device for connecting a pipe to be laid to the drill, wherein the ploughshare is arranged behind the drill when viewed in the laying direction.

STATE OF THE ART

Several laying methods are currently known for laying pipes, which can be made of steel or plastic, for example:

Whereas flexible pipes can be pulled into the ground in a comparatively simple manner using a plough, a "torpedo" attached to the plough is used for rigid pipes, whose task is to create a tunnel by displacing soil in which the pipe to be laid can be pulled. The diameter of the torpedo is larger than the diameter of the pipe to be laid, which is releasably attached inside the torpedo.

With this torpedo method, soil is displaced on all sides, especially in the direction of the earth's surface, whereby the amount of soil to be displaced is proportional to the diameter of the torpedo used—the larger the diameter of the pipe to be laid, the more soil must ultimately be displaced.

In particular, in the case of larger pipe diameters, this results in substantial loosening of the soil in the area of the tunnel created by the torpedo, which has the result that displaced soil tends to trickle back onto the pipe pulled through the tunnel more quickly. This collapsing soil increases the friction between the tunnel wall and the pipe, with the result that the tensile force required for laying increases rapidly as the route length increases. Therefore, with larger pipe diameters, the pipe sections that can be laid using this method are very short, since the maximum tensile forces are quickly reached.

For the reasons set out above, the maximum diameter of pipes that can be laid using a plough is currently limited to around 630 mm.

In order to lay pipes with even larger pipe diameters, trenches, for example, have to be excavated using excavators or milling machines, into which the pipes to be laid can then be inserted. The great effort, which arises in particular from the excavation and filling in of the trenches is just as obvious as the space requirement associated with such methods (working strips having a width of up to 36 m are required). Alternatively, drilling methods are also used in which a drill head is pulled in the laying direction by a drill rod guided in a pilot borehole; here, too, the maximum possible pipe diameters quickly reach their limits for the reasons set out above, and the use of the separate drill rods involves considerable effort. In addition, methods are also known in which a drill head is pressed in the laying direction by means of the pipe to be laid. On the one hand, this requires powerful presses that have to be installed in specially designed and reinforced pits in order to press the pipe to be laid, at one end of which the drill head is attached, forwards section by section; on the other hand, the pipelines to be laid must be configured to be rigid, since the entire propulsion force must be transmitted to the drill head via the pipeline itself. After a certain distance has been reached between the press and the drill head, the press has to be removed and moved into a new pit, which makes this process extremely complex.

OBJECT OF THE INVENTION

It is therefore an object of the invention to overcome the disadvantages of the prior art and to propose a device for laying pipes in the ground, by means of which pipes having diameters of more than 630 mm can also be laid in a simple manner.

Further objects can be found in the description.

DESCRIPTION OF THE INVENTION

This object is achieved according to the invention by a device for laying pipes in the ground, the device comprising a ploughshare with a ploughshare shoe, wherein the ploughshare shoe has at least one displacement element protruding in a laying direction, a drill, which drill is connected to the ploughshare and at least one in a drill head arranged in a drill head housing section of a drill housing and a conveyor device arranged in a conveyor housing section of the drill housing for removing drilled material, as well as a connection device for connecting a pipe to be laid to the drill, wherein the ploughshare is arranged behind the drill when viewed in the laying direction.

Similarly to known laying methods in which a plough is used, stones and other obstacles located in the ground are displaced by the displacement element and/or the ploughshare. In addition, soil is picked up and removed by the drill in order to create a borehole for the pipe to be laid. This results in the advantage over conventional drilling methods that said obstacles do not have to be comminuted and removed by the drill. Since the ploughshare is arranged behind the drill in the laying direction, the soil is already loosened by the ploughshare and/or the displacement element before it is grasped by the drill, so that the drill can dig through the soil with less effort than with conventional drilling methods. The soil grasped by the drill is conveyed to the earth's surface by means of a conveyor device, where the drilled material can be distributed or removed; soil trickling back onto the pipe to be laid, which is connected to the drill by means of the connection device, is thus prevented in a reliable manner. Overall, by means of the device according to the invention it is possible to implement a laying method in which rigid and flexible pipes or conduits can be laid in a simple manner without wide working or digging strips, or specially reinforced pits to house presses or the like being required for this. The necessary propelling force can be transferred to the device via the ploughshare.

In a preferred embodiment of the device according to the invention, the conveyor housing section is arranged to run transversely to the laying direction in order to convey the drilled material above ground.

It is thereby possible to convey away the drilled material loosened by the displacement element and/or the ploughshare shoe and grasped by the drill, transversely to the laying direction in which the displacement element protrudes. In particular, the drilled material can be conveyed directly to the earth's surface, so that the drilled material in the borehole can no longer lead to an increase in the required tensile forces.

In another preferred embodiment of the device according to the invention, the drill is connected to the ploughshare by means of a coupling element in such a manner that a free space remains between the coupling element and the drill head. In particular, the extent of this free space can be adjusted by the specific configuration of the coupling element.

Thus, soil that has been displaced and/or loosened by the displacement element and/or by the ploughshare and—due to the movement of the device—has now collected in the free space, can be grasped by the drill head and conveyed away by the conveyor device. This free space preferably extends over the entire catchment area of the drill head, over which catchment area the drill head can grasp soil.

The coupling element preferably acts on the drill at least in the area of the drill head, in particular the drill head housing section, and in the area of the conveyor device, in particular the conveyor housing section.

This ensures particularly stable guidance of the drill pulled by the ploughshare. In particular, the coupling element acting on the drill head housing section and the conveyor housing section has the result that forces transmitted from the soil to the conveyor housing section, in particular frictional, compressive and tensile forces, can be dissipated via the coupling element. In this way, a structural failure of the conveyor housing section, on which high forces act in the operating state of the device, is prevented. The coupling element can be articulated or rigidly connected to the drill on an underside of the drill head housing section facing away from the earth's surface—and therefore also from the conveyor housing section.

In another preferred embodiment of the device according to the invention, the drill is connected to the ploughshare and/or the coupling element in a horizontally pivotable manner.

As a result, horizontal changes in direction can easily be accomplished by the ploughshare without the pipe to be laid, which is connected to the device via the connection device, in particular by a rigid tube, being able to transmit a force directed contrary to the change in direction to the ploughshare. In this case, either the coupling element can be rigidly connected to the drill but pivotably connected to the ploughshare; alternatively, the ploughshare and the coupling element can be rigidly connected to one another and a pivotable connection can be provided between the drill and the coupling element.

In another preferred embodiment of the device according to the invention, the drill is connected to the ploughshare and/or the coupling element in a vertically pivotable manner.

Similarly to the advantages described above in connection with the horizontal pivotability, in this embodiment a particularly smooth pivotability of the device in the vertical is obtained—the device according to the invention can be controlled in a particularly simple and energy-saving manner as a result.

In another preferred embodiment of the device according to the invention, the displacement element is arranged in such a manner that when the device is used as intended, soil is displaced and/or loosened by the displacement element before it is grasped by the drill head.

In particular, the displacement element can be arranged substantially at the same height as the drill head.

As a result of such an arrangement the required propelling force is reduced even further. Soil is particularly preferably firstly displaced and/or loosened by the displacement element before the drill head grasps this soil when the device moves through the soil in the laying direction during its operation as intended. In this case, the displacement element can preferably lie within a projection of the drill head extending in the laying direction, but particularly preferably not completely cover it.

In another preferred embodiment of the device according to the invention, the drill housing comprises a widened housing section with an enlarged cross-section compared to the drill head housing section, wherein the drill head housing section is arranged behind the widened housing section when viewed in the laying direction, and wherein the widened housing section preferably directly adjoins the drill head housing section.

Due to the widened housing section of the drill housing an inner wall of a borehole created by the drill head is pressurized and consolidated, with the result that soil is prevented from trickling onto the pipe to be laid and/or any obstruction of the pipe movement by stones or other obstacles in the borehole is reliably prevented. A further reduction in the required propelling force can be achieved in particular when the widened housing section is directly connected to the drill head housing section.

In another preferred embodiment of the device according to the invention, the ploughshare shoe is arranged on the ploughshare so that it can be adjusted in its orientation.

As a result, vertical changes in direction of the device can be brought about by means of a corresponding adjustment of the orientation of the ploughshare shoe. In particular, a laying depth, at which laying depth the pipe to be laid is to be guided through the soil, can be set or changed in the operating state of the device.

One of the objects on which the invention is based is furthermore achieved by a system, which system comprises at least one laying vehicle and the device according to the invention, wherein the ploughshare of the device is connected to the laying vehicle or is part of the laying vehicle.

The laying vehicle can be a plough, for example, as is also used in the prior art laying methods described initially. This plough can preferably be detachably connected to the ploughshare, or the ploughshare can be part of the plough. The plough can either apply the required propelling force itself in order to pull the device according to the invention through the soil and/or one or more towing vehicles can be provided which pull the plough. In addition, the pipe-laying vehicle can comprise means for storing, distributing or forwarding to other vehicles the drilled material that has been brought to the surface from the borehole.

In another preferred embodiment of the device according to the invention, the laying vehicle has a control device for controlling at least the orientation of the ploughshare shoe and/or a rotational speed of the drill head and/or a conveying speed of the conveyor device.

As a result, no additional devices, in particular no control vehicles, are required to control the device according to the invention.

The control device is preferably connected to the ploughshare shoe and/or the drill head and/or the conveyor device via control means running in the ploughshare.

Thus, the control means, which are configured as hydraulic lines, for example, can be optimally protected against the effects of external forces or damage; moreover, by arranging appropriate connections in the ploughshare, it is possible to simply and reliably establish an operative connection with appropriate control devices. Overall, a reliable control of the device according to the invention can be ensured in a particularly simple manner.

One of the objects on which the invention is based is also achieved by a method for laying a pipe in the ground between a starting position and an end position along a laying direction using the system described above, the method comprising at least the following method steps:

Connecting the pipe to be laid to the connection device of the device before the device has reached the starting position or when the device is in the starting position;

Moving, in particular pulling, the laying vehicle in the laying direction whilst simultaneously operating the drill head and the conveyor device;

Detaching the pipe from the connection device after the device has reached the end position.

The pipe to be laid can be connected to the device according to the invention, in particular above ground, i.e. on the earth's surface. By moving the laying vehicle in the direction along which the pipe is to be laid in the ground between the initial and the end position, i.e. in the laying direction, the correspondingly adjusted ploughshare shoe begins to dig into the soil, with the result that the ploughshare, the drill attached to the ploughshare and the pipe connected to the drill reach at least partially below the surface of the earth. After a desired laying depth has been reached, the ploughshare shoe can be adjusted or controlled, for example by means of the control device of the laying vehicle, in such a way that the laying depth is maintained. Whilst the laying vehicle is moving on the surface in the laying direction, both the drill head and the conveyor device are also operated, with the result that soil that has been displaced or loosened by the displacement element and/or the ploughshare shoe and/or the ploughshare is grasped by the drill head and conveyed away by the conveying device, so that a borehole is formed, into which borehole the pipe connected to the device can be drawn without the soil exerting too great a frictional force on the pipe. It is particularly advantageous if the drill housing has a widened housing section arranged between the drill head housing section and the drill, the diameter of which is both larger than that of the pipe to be laid and also larger than the diameter of the drill head. The earth material forming an inner wall of the borehole is displaced or compacted by the widened housing section, so that the inner wall of the borehole is stabilized and secured against collapse. To stabilize the borehole, bentonite or water can also be used, which can also be introduced into the borehole using the device according to the invention. After reaching the end position, the laid pipe can be detached from the device and, if necessary, connected to other pipes or connections, preferably welded.

BRIEF DESCRIPTION OF THE FIGURES

The invention will now be explained in more detail using one (of the) exemplary embodiment(s). The drawings are exemplary and are intended to explain the idea of the invention, but in no way restrict or even definitively reproduce it.

In the drawings.

WAYS TO CARRY OUT THE INVENTION

Figure 1:
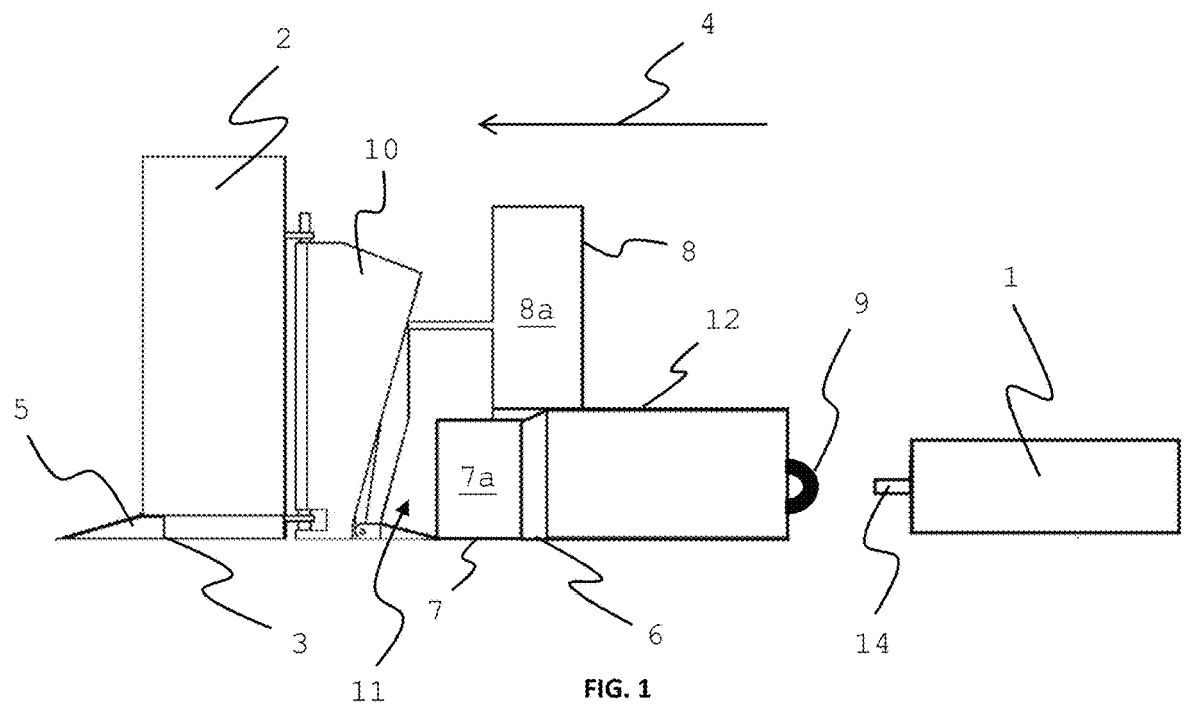
FIG. 1 shows the device according to the invention in a side view (schematic representation)
Figure 2:
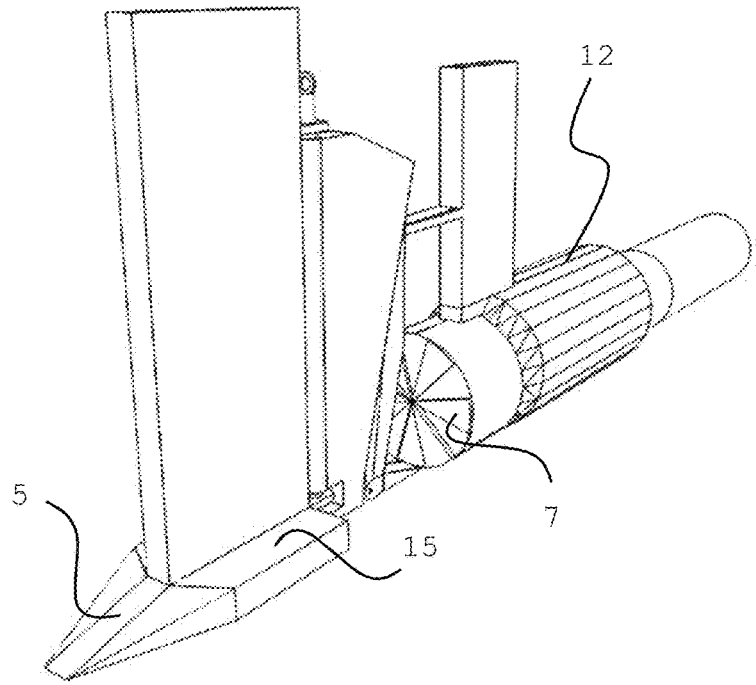
FIG. 2 shows the device from FIG. 1 in an axonometric view

The structure of the device according to the invention in an exemplary embodiment can be seen from FIGS. 1 and 2.

The device itself initially comprises a ploughshare 2, at the lower end of which a ploughshare shoe 3 is arranged. This ploughshare shoe 3 is held movably, in particular tiltably, on the ploughshare 2 and makes it possible to adjust or change a laying depth, at which laying depth a pipe 1 to be laid is to be laid in the ground. The ploughshare 2 can be connected to a laying vehicle 13 (see FIG. 3), such as a plough or can be formed in one piece with this.

In addition to two flat, wing-like sections 15, which extend on both sides of the ploughshare 2 and preferably orthogonally thereto, the ploughshare shoe 3 also has a displacement element 5, which displacement element 5 protrudes from the ploughshare 2 in the laying direction 4. This displacement element 5 can comprise one or more wedge-shaped extensions which taper with increasing distance from the ploughshare 2. In particular, both the width and the height of the wedge-shaped extension or extensions can decrease in the laying direction 4.

Preferably, the ploughshare shoe 3 is attached rotatably to the ploughshare 2 about a point located in the contact area between the displacement element 5 and the wing-like sections 15, wherein the end of the wing-like sections 15 facing away from the displacement element 5 is adjustable by means of an (not shown) actuating element.

If the ploughshare 2 is now moved in a horizontal direction— for example by means of the laying vehicle—the vertical position of the ploughshare shoe 3 relative to the earth's surface, i.e. the laying depth, can be set or changed by appropriately selecting the position of the ploughshare shoe 3: if the ploughshare shoe 3 is located in the position shown in FIGS. 1 and 2, the laying depth will not vary significantly with horizontal movement; however, if the displacement element 5 points towards the ground surface (so that the wing-like sections 15 of the ploughshare shoe 3 point in the opposite direction), the ploughshare shoe 3 will move towards the earth's surface in the course of the horizontal movement of the device; similarly, the laying depth will increase if the wing-like sections 15 point towards the earth's surface.

Soil located in front of the ploughshare shoe 2 is grasped and loosened by the movement of the device by the displacement element 5 and/or the ploughshare shoe 3 and/or the ploughshare 2; obstacles in the soil, such as stones and the like, are pushed into higher or lower layers of the earth, or into lateral layers. The loosened soil is then grasped by a drill head 7 of a drill 6 connected to the ploughshare 2 by means of a coupling element 10 and conveyed away via a conveyor device 8 so that a borehole for the pipe 1 to be laid is formed. For this purpose, the ploughshare 2 is arranged behind the drill 6 when viewed in the laying direction; this corresponds to the sequence shown in FIGS. 1 and 2.

The drill head 7 is accommodated in a drill head housing section 7a of the drill 6 and the conveyor device 8 is accommodated in a conveyor housing section 8a of the drill 6. As shown in FIGS. 1 and 2, the coupling element 10 can be connected horizontally pivotally to the ploughshare 2 and vertically pivotally to the drill 6. In this case, the coupling element 10 can act on the drill in the area of the drill head housing section 7a and in the region of the conveyor housing section 8a. This results in a free space 11 between the coupling element 10 and the drill head 7, in which free space 11 soil that has been loosened and/or displaced by the displacement element 5 and/or the ploughshare shoe 3 and/or the ploughshare 2 can collect and then be grasped by the drill head 7.

Due to a widened housing section 12 of the drill 6, which widened housing section 12 is provided between the drill head housing section 7a and a connection device 9 provided on the drill 6 for connecting the pipe 1 to be laid to the device, the inner wall of the borehole created by the drill head 7 is consolidated and secured against collapsing. For this purpose, the drill 6 has a larger diameter in the widened housing section 12 than in the drill head housing section 7a. The drill head housing section 7a particularly preferably goes over directly into the widened housing section 12 in the area of a diameter expansion of the drill 6, as is shown in FIGS. 1 and 2.

Consequently, the problem known from the prior art of soil falling onto the pipe 1 to be laid and the associated increase in the frictional forces acting on the pipe 1 is solved by means of the device according to the invention; the pipe 1 connected to the device by means of the connection device 9, which for this purpose can also have a coupling 14 to produce a positive connection with the connection device 9, is pulled directly into the stabilized borehole by the movement of the device, which is free of larger stones or other obstacles—these were previously displaced by the displacement element 5 and, if necessary, pressed firmly into the inner wall of the borehole by the widened housing section 12—as well as loosened soil, since this is conveyed away by means of the conveyor device 8 provided in the drill 6 immediately after it has been grasped by the drill head 7, in particular was conveyed to the earth's surface.

Figure 3:
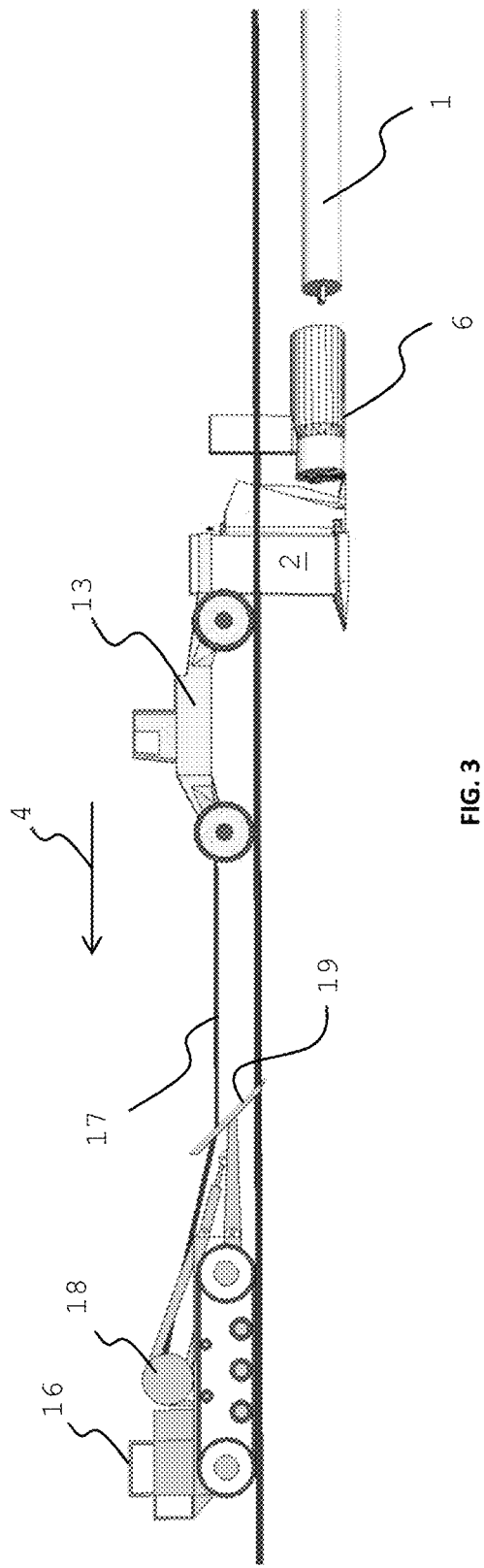
FIG. 3 shows a schematic representation of the device connected to a laying vehicle.

As can be seen from FIG. 3, the laying vehicle 13 itself is pulled in the laying direction 4 by a caterpillar winch 16. Here the caterpillar winch 16 is equipped with a winch 18 and an anchor fluke 19 and arranged at some distance, for example 110 metres in front of the laying vehicle 13. The caterpillar winch 16 is connected to the laying vehicle 13 via one or more steel cables 17. In the operating state, the anchor fluke 19 is lowered into the ground in order to ensure a stable position of the caterpillar winch 16 before the winch is actuated in order to wind up the steel cables 17 in the laying direction 4.

REFERENCE LIST

1 Pipe
2 Ploughshare
3 Ploughshare shoe
4 Laying direction
5 Displacement element
6 Drill
7 Drill head
7a Drill head housing section
8 Conveyor device
8a Conveyor housing section
9 Connection device
10 Coupling element
11 Free space
12 Widened housing section
13 Laying vehicle
14 Coupling of the pipe
15 Wing-like sections
16 Caterpillar winch
17 Steel cable
18 Winch
19 Anchor fluke

The invention claimed is:

1. A device for laying pipes in the ground, the device comprising—a ploughshare with a ploughshare shoe, wherein the
 ploughshare shoe has at least one displacement element protruding in a laying direction,
  a drill, which drill is connected to the ploughshare and comprises at least one drill head arranged in a drill head housing section of a drill housing and a conveyor device arranged in a conveyor housing section (8a) of the drill housing for removing drilled material in the form of soil grasped by the drill head to the surface, and
  a connection device for connecting a pipe to be laid to the drill, wherein
  the ploughshare is arranged behind the drill when viewed in the laying direction so that the soil is already loosened by the ploughshare and/or the displacement element before it is grasped by the drill, the laying direction being a direction in which the ploughshare and the drill are configured to be pulled through the soil.

2. Device according to claim 1, characterized in that the conveyor housing section is arranged to run transversely to the laying direction in order to convey the drilled material above ground.

3. Device according to claim 1, characterized in that the drill is connected to the ploughshare by means of a coupling element so that a free space remains between the coupling element and the drill head.

4. Device according to claim 3, characterized in that the coupling element acts on the drill at least in the area of the drill head, in particular the drill head housing section, and in the area of the conveyor device, in particular of the conveyor housing section.

5. Device according to claim 1, characterized in that the drill is connected to the ploughshare and/or the coupling element so that it can be pivoted horizontally.

6. Device according to claim 1, characterized in that the drill is connected to the ploughshare and/or the coupling element so that it can be pivoted vertically.

7. Device according to claim 1, characterized in that the displacement element is arranged in such a manner that when the device is used as intended, soil is displaced and/or loosened before it is gripped by the drill head.

8. Device according to claim 1, characterized in that the displacement element is arranged substantially at the same height as the drill head.

9. Device according to claim 1, characterized in that the drill housing comprises a widened housing section with an enlarged cross-section compared to the drill head housing section, wherein the drill head housing section is arranged behind the widened housing section when viewed in the laying direction, wherein the widened housing section preferably directly adjoins the drill head housing section.

10. Device according to claim 9, characterized in that the connection device is arranged within the widened housing section or on an end region of the widened housing section facing away from the drill head.

11. Device according to claim 1, characterized in that the ploughshare shoe is held on the ploughshare so that its orientation can be adjusted.

12. System comprising a laying vehicle and a device according to claim 1, wherein the ploughshare of the device is connected to the laying vehicle or is part of the laying vehicle.

13. System according to claim 12, characterized in that the laying vehicle has a control device for controlling at least the orientation of the ploughshare shoe and/or a rotational speed of the drill head and/or a conveying speed of the conveyor device.

14. System according to claim 13, characterized in that the control device is connected to the ploughshare shoe and/or the drill head and/or the conveyor device via control means running in the ploughshare.

15. Method for laying a pipe in the ground between a starting position and an end position by means of a system according to claim 12, comprising the following method steps:
- connecting the pipe to be laid to the connection device of the device before the device has reached the initial position or when the device is in the initial position;
- pulling the laying vehicle in the laying direction whilst simultaneously operating the drill head and the conveyor device;
- detaching the pipe to be laid from the connection device after the device has reached the end position.

\* \* \* \* \*